June 15, 1926.
T. F. HICKEY
1,588,419
MOVING AND TURNING ATTACHMENT FOR PORTABLE PLATFORM SCALES
Filed August 8, 1924 2 Sheets-Sheet 1
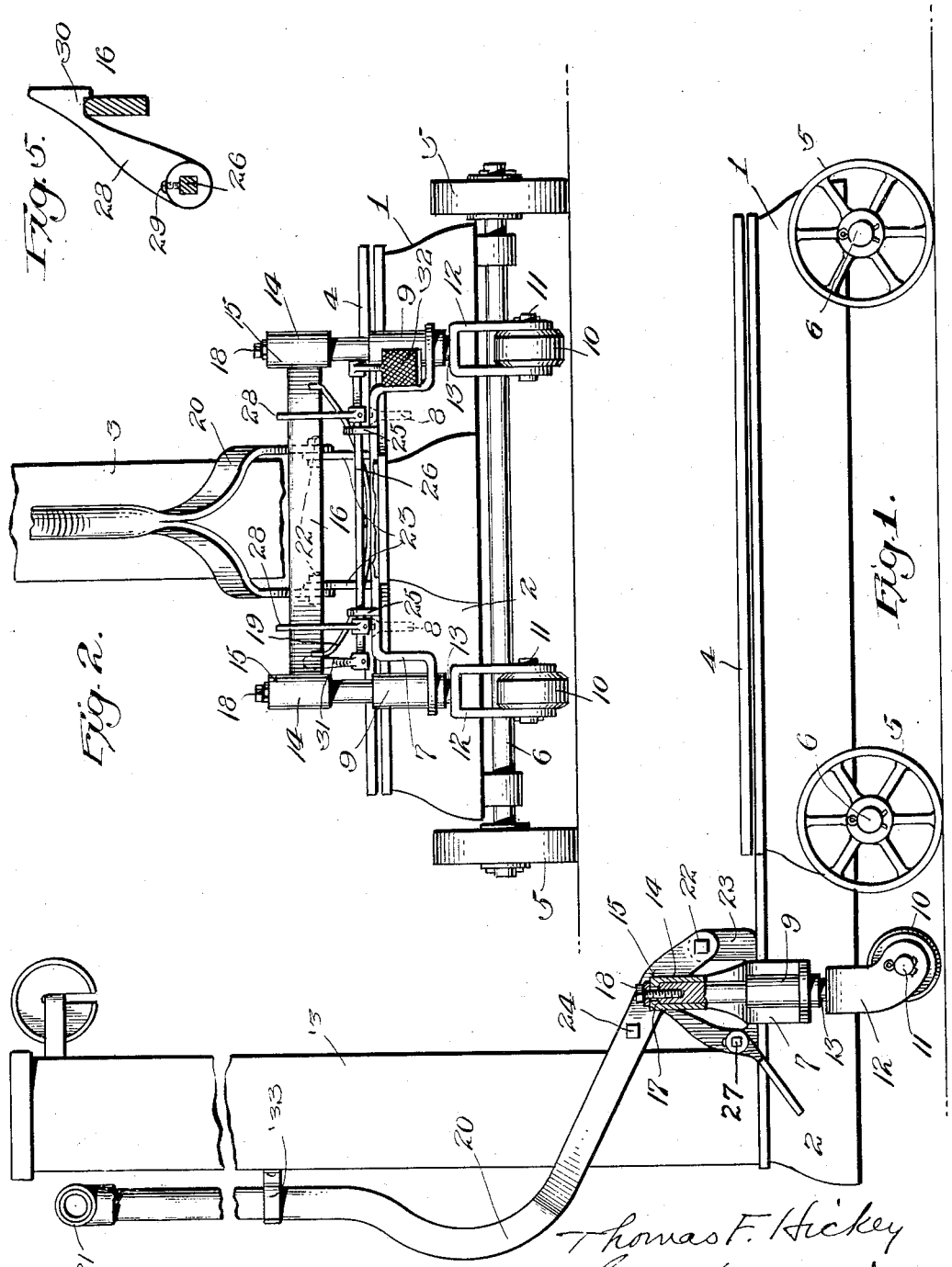
Inventor: Thomas F. Hickey

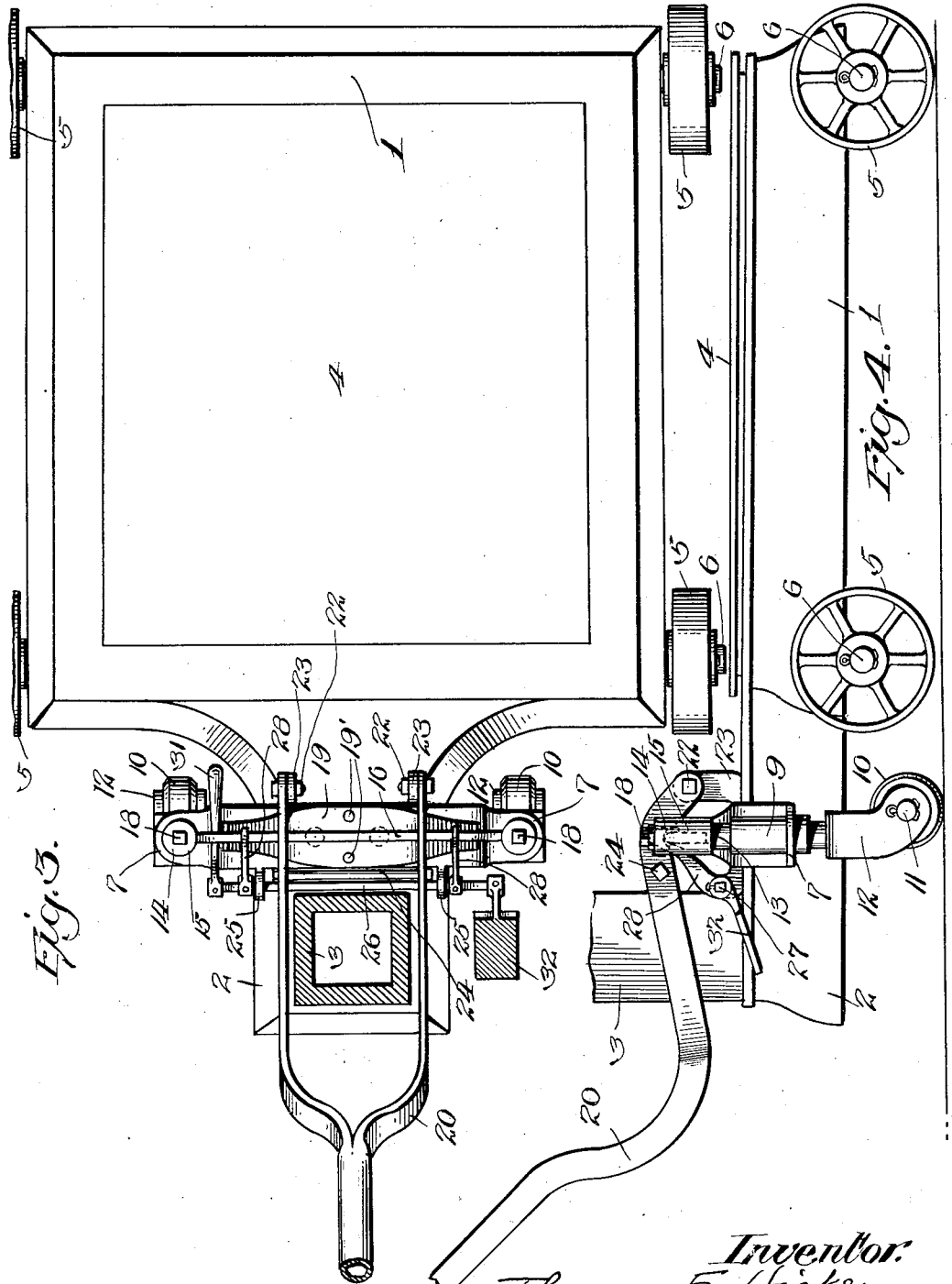

Patented June 15, 1926.

1,588,419

UNITED STATES PATENT OFFICE.

THOMAS F. HICKEY, OF STILLWATER, NEW YORK.

MOVING AND TURNING ATTACHMENT FOR PORTABLE PLATFORM SCALES.

Application filed August 8, 1924. Serial No. 730,921.

Wheeled platform scales are commonly used in factories and warehouses for weighing goods which have to be transferred after being weighed. The workman, after weighing the goods, wheels the portable platform scales to the point where its load is to be transferred and it is for that purpose that scales of this character are provided with wheels.

The axles of portable platform scales being fixed, such scales are subject to very rough handling, with the impairment of accuracy, because the workman, when moving the scale from place to place, finds it necessary to forcibly swing the pillar end of the scales to one side or the other when effecting a change in direction of travel. It is a common practice for the workman to grasp the pillar or the cap and forcibly swing the scales to one side or the other. This results in wrenching the pillar and seriously disturbs adjustments of the weighing mechanism, including the scale beam and the operating mechanism connecting it to the levers which support the platform.

The object of my invention is the provision of novel means, adapted to be readily attached to any portable platform scale, whereby the pillar end of the scale may be slightly elevated to cause the usual supporting wheels at that end of the scale to be raised clear of the floor and to support that end of the scale by supplemental wheels which are swiveled, thus enabling the platform scale to be readily moved from place to place, turned in any direction, and manipulated, while carrying its load, without possibility of wrenching the pillar, its cap, the scale beam, or the operating mechanism connecting the scale beam to the platform.

My invention makes it unnecessary for the workman to grasp the pillar or other parts of the scale as is now commonly done and, by providing a convenient, simple, and easily operated self-contained device for moving and turning a platform scale, provides for the workman a superior arrangement for manipulating the scale which he uses in his every day work so that he has no desire to resort to the old time method of forcibly slewing the scale to one side when turning it.

The improved mechanism entering into my invention only elevates the pillar end of the scale sufficiently to cause one set of the usual wheels to be elevated clear of the floor and to lower into engagement with the floor the swiveled steering wheels which I have provided. The invention also provides a convenient pushing and pulling handle for use by the workman, rendering it easy for him to move his scales from place to place.

I am aware that the invention is susceptible of modification without departing from the essential principle thereof which embodies supplemental swiveled wheels and means by which they may be raised to render them inactive, or lowered to bring them to active, supporting position. Therefore, the disclosure of the invention is to be considered as illustrative and not in limitation of the mechanical elements by which the inventive idea may be carried out.

The use of my invention does not interfere with the support of the scale in the usual manner when it is employed for weighing purposes, which is of importance because inaccuracy is practically sure to follow unequal or improper support in a scale of this character.

In the accompanying drawings:

Figure 1 is a side elevation, the pillar and operating handle being broken away and certain parts in section, the scale being arranged for weighing.

Fig. 2 is an end elevation looking toward that end of the scale to which my invention is attached, the scale being in condition for weighing.

Fig. 3 is a plan view, the pillar being in section and the operating lever broken away, the parts being arranged for supporting the pillar end of the scale by swiveled wheels.

Fig. 4 is a side elevation, the parts being in the condition shown in Fig. 3; and Fig. 5 is a detail view of one of the latches.

An ordinary platform scale is shown in the drawings as provided with my improvements. The scale frame is shown at 1 and has the usual neck 2 from which rises the ordinary pillar 3. The depressible weighing platform appears at 4.

To render them portable, platform scales are provided with wheels 5 carried by axles 6 which are connected to the frame or body 1 and I have illustrated the usual platform scale as provided with these wheels and axles to disclose the kind of scale to which my invention relates.

The wheels 5 enable the scale to be moved from place to place but the travel is in a straight line unless the scale is forcibly shifted sidewise to effect a turn. It frequently happens that a scale of this character, with its load, cannot be moved in a direct line from the point where the load is weighed to the point where the scale has to be moved to enable the load to be removed. Consequently, wheeled platform scales are subject to very rough treatment in factories, warehouses and other industrial establishments inasmuch as the workman either has to bodily lift one end of the scale in order to swing it around or turn it, or, he must forcibly slew the scale. The latter method is the easiest one for the workman, hence he finds it convenient to grasp the pillar 3 or the cap thereof and use same as a handle for the foregoing purpose. This rough treatment soon wrenches the pillar, its cap, and the mechanism interposed between the levers which support the platform 4 and the scale beam, resulting in inaccuracy in weighing operations and it is a well known fact that it costs considerably in even moderate sized plants or warehouses to readjust and repair portable platform scales.

My invention provides supplemental, swiveled, steering wheels for a platform scale, which may be raised out of the way when weighing operations are being carried on, or, quickly and easily let down to rest on the floor and slightly elevate the end of the scale, so that they may be used when the scale is moved from place to place with its load, thus making it unnecessary and really laborious for the workmen to resort to the old method of manipulating the scale.

My attachment is self-contained so that it may be bodily applied to the neck of any of the well known types of platform scales. The operative parts are carried by a saddle plate or yoke 7 which is connected by machine screws 8 to the frame 1, said saddle plate straddling the neck 2 and being provided with depending parts which have elongated bearings 9.

The steering wheels 10 have the general appearance and mounting of caster wheels; they are mounted on axles 11 carried by yokes 12 which have pintles 13 that are journaled in the bearings 9 and slidable up and down in them. Thus, the wheels 10 and yokes 12 may swing or turn in one direction or the other with a caster wheel action when said wheels are let down into engagement with the floor as shown in Fig. 4. The mechanism now to be described provides for holding the wheels 10 in the raised position of Figs. 1 and 2 or the lowered position disclosed in Figs. 3 and 4 and for moving them from one position to the other.

The upper ends of the pintles 13 are adapted to freely turn in step bearings 14 in the ends 15 of a cross bar 16. Preferably, the ends of the pintles 13 and of the bearings 14 are coned as shown at 17, Fig. 1, to minimize friction when the wheels 10 are in use as shown in Fig. 4. Cap bolts 18 pass loosely through holes in the upper ends of the parts 15 so as to be adapted to freely turn and they are screwed into the upper ends of the pintles 13. Check nuts are provided. By this means, the wheels 10 and their yokes and pintles are prevented from dropping out and, further, any desired setting or adjustment may be obtained.

Suitable spring means is employed to hold the bar 16 raised so that the wheels 10 will clear the floor when weighing operations are being carried on. A convenient spring means for that purpose is the bowed spring 19 which is bolted or screwed at 19' to the saddle plate or yoke 7, the ends of the spring having notches receiving the lower edge of the cross bar 16.

A lever 20 which is pivoted to ears 23 of yoke 7 at 22, is arranged in overlying relationship to the bar 16 so that when the lever is pulled downwardly from the position shown in Fig. 1 to that shown in Fig. 4, the bar 16 will be depressed and the wheels 10 forced into engagement with the floor to thereby elevate the adjacent wheels 5 as shown in Fig. 4 so that the scale will then be supported by the usual rear wheels 5 and the swiveled wheels 10. The lever 20 when pulled down is in a convenient position for use as a handle in pulling or pushing the scale, and turning it in one direction or the other, a suitable cross piece 21, Fig. 1, being provided. The lower end of the lever 20 is forked so that it will straddle the pillar 3, but it is prevented from engaging the pillar to any appreciable extent because it is stiffened by a tie bolt and spreader 24. Preferably, the lower edges of the forked part of the lever 20, where they are adapted to engage with the bar 16, are rounded or curved, and the edge of the bar may be rounded, so that the pressure on the bar 16 will mainly be downwardly and lateral cramping will be obviated.

Mounted in ears 25 on the saddle plate or yoke 7, is a shaft 26 which has squared ends 27. Latches 28 which have square holes as shown in Fig. 5, are secured on the squared parts 27 by set screws 29. These latches have notched heads 30 which are adapted to engage the upper edge of the bar 16 when the lever 20 is swung downwardly to depress said bar, this locking action appearing in Figs. 3 and 5. Spring means might be provided to cause the latches to engage the bar 16 but I prefer to use a counterweight lever 31 which is secured on the squared end of shaft 26 and which throws the latches into operative position when bar 16 is forced downwardly.

To release the latches 28, a treadle 32 is secured on the other squared end of the shaft 26 so that by pressing on this treadle the latches will be disengaged from bar 16 and the weight of the scale will then cause the scale to descend if the lever 20 is allowed to rise. The spring 19 holds the wheels 10 clear of the floor, once the bar 16 is released.

To hold the lever 20 in its raised position, a clip 33 is provided on the pillar 3.

Ordinarily, the scale is arranged as shown in Fig. 1 so that it is evenly supported by the wheels 5. The material to be weighed may then be loaded on the platform 4. When the scale, with its load, is to be moved to some other point, the workman pulls down on the lever 20, grasping the handle 21 for that purpose. This action causes the lever to depress the bar 16, forcing it, and the wheels 10 downwardly, the pintles 13 sliding in the bearings 9. Finally, the counterweight 31 causes the latches 28 to engage the upper edge of bar 16 as shown in Figs. 3 and 5, thus latching the wheels 10 in their lowered position which is the position shown in Fig. 4. The wheels 10 then take the place of the adjacent wheels 5 and the workman can push and pull the scale about as he desires and turn it in one direction or the other as the wheels 10 are caster wheels and automatically turn to provide the desired path of travel. To restore the scale to its ordinary position, the workman depresses the treadle 32, thus releasing the latches 28 and by allowing the lever 20 to rise, it is finally brought to the position shown in Fig. 1, whereupon the wheels 5 afford the sole support for the platform as the spring 19 raises the wheels 10 clear of the floor as the lever 20 rises.

I claim:

1. The combination with a portable platform scale, of a pair of steering wheel supports and wheels mounted thereby, said supports being carried by the scale and adapted to be raised to cause the said wheels to clear the floor, and to be lowered to cause the said wheels to engage the floor, a cross-bar connecting the steering wheel supports, releasable latching means adapted to engage the cross-bar to hold the supports in lowered position, spring means for raising the supports and the cross-bar, and a manually operable lever adapted to cooperate with the cross-bar to depress the supports.

2. The combination with a portable platform scale, of a pair of steering wheel supports and wheels mounted thereby, said supports being carried by the scale and adapted to be raised to cause the said wheels to clear the floor, and to be lowered to cause the said wheels to engage the floor, a cross-bar connecting the steering wheel supports, releasable latching means adapted to engage the cross-bar to hold the supports in lowered position, a bowed spring engaging the cross-bar and adapted for raising the supports and cross-bar, and a manually operable lever adapted to engage the upper side of the cross-bar for the purpose of depressing the supports to a position where the latching means may engage the cross bar.

In testimony whereof I affix my signature.

THOMAS F. HICKEY.